(12) United States Patent
Anand et al.

(10) Patent No.: US 7,778,202 B2
(45) Date of Patent: Aug. 17, 2010

(54) METHOD AND APPARATUS TO PROVISION NETWORK ROUTES

(75) Inventors: Ramasubramanian Anand, Plainfield, IL (US); Kenneth M. Fisher, Aurora, IL (US); David W. Jenkins, North Aurora, IL (US)

(73) Assignee: Tellabs Operations, Inc., Napierville, IL (US)

( * ) Notice: Subject to any disclaimer, the term of this patent is extended or adjusted under 35 U.S.C. 154(b) by 278 days.

(21) Appl. No.: 11/848,450

(22) Filed: Aug. 31, 2007

(65) Prior Publication Data

US 2008/0298239 A1 Dec. 4, 2008

Related U.S. Application Data

(60) Provisional application No. 60/932,840, filed on Jun. 1, 2007.

(51) Int. Cl.
 *H04L 12/28* (2006.01)
(52) U.S. Cl. ..................................................... 370/254
(58) Field of Classification Search .................. None
 See application file for complete search history.

(56) References Cited

U.S. PATENT DOCUMENTS

| | | | |
|---|---|---|---|
| 6,259,679 B1 * | 7/2001 | Henderson et al. ........... 370/254 |
| 6,314,093 B1 | 11/2001 | Mann et al. | |
| 6,807,190 B1 * | 10/2004 | Kremer ........................ 370/452 |
| 7,127,267 B2 * | 10/2006 | McGowan et al. ........... 455/522 |
| 7,167,483 B1 * | 1/2007 | Sharma et al. ............... 370/442 |
| 7,411,974 B2 * | 8/2008 | Attar et al. .................... 370/465 |
| 2002/0036988 A1 | 3/2002 | Cardwell et al. | |
| 2002/0072384 A1 * | 6/2002 | Chheda ........................ 455/522 |
| 2003/0099014 A1 * | 5/2003 | Egner et al. .................. 359/124 |
| 2004/0027384 A1 * | 2/2004 | Levesque et al. ............. 345/771 |
| 2005/0185967 A1 * | 8/2005 | Hoshida ....................... 398/173 |
| 2006/0067236 A1 | 3/2006 | Gupta | |
| 2008/0267078 A1 * | 10/2008 | Farinacci et al. ............. 370/244 |
| 2008/0291925 A1 | 11/2008 | Fisher et al. | |
| 2009/0304380 A1 * | 12/2009 | Sadananda et al. ............ 398/26 |

FOREIGN PATENT DOCUMENTS

| | | |
|---|---|---|
| EP | 0 791 880 | 8/1997 |
| EP | 1 278 324 | 1/2003 |
| WO | WO 97/23101 | 6/1997 |

\* cited by examiner

*Primary Examiner*—Chirag G Shah
*Assistant Examiner*—Amarnauth Persaud
(74) *Attorney, Agent, or Firm*—Fitzpatrick, Cella, Harper & Scinto

(57) ABSTRACT

A method to provision routes in a network having a plurality of nodes includes receiving a designation of a primary source node, determining possible destination nodes from the designated source node and outputting information indicating the possible destination nodes. The method further includes receiving a designation of a destination node from among the possible destination nodes and updating information regarding optical characteristics based on a route from the source node to the designated destination node and outputting information related to the updated optical characteristics.

26 Claims, 6 Drawing Sheets

METHOD AND APPARATUS TO PROVISION NETWORK ROUTES

CROSS-REFERENCE TO RELATED APPLICATION

This application claims the benefit of priority of U.S. Provisional Application No. 60/932,840, filed Jun. 1, 2007, which is herein incorporated by reference.

BACKGROUND OF THE INVENTION

1. Field of the Invention

The present invention relates to provisioning network routes and, more particularly, relates to interactively provisioning network routes.

2. Description of the Related Art

In a communication network having a plurality of interconnected nodes, there may be multiple routes that data can traverse from a source node to a drop node (i.e., a node where the data will be used). There may be a direct link between the source node and the drop node, and/or there may be a plurality of routes from the source node to the drop node via one or more intermediate nodes. Particular routes between a source node and each drop node are provisioned (i.e., established) so that network equipment know how to route data to a particular drop node. The information regarding provisioned routes can be stored in a routing table that a node uses to determine the appropriate route to send or forward data (the routing table can be stored in a computer program memory, for example), or the network can be engineered to ensure that data flows in a certain way (i.e., network equipment can be wired or cabled to constrain the flow of data in a specific direction).

Various techniques are known for automatically provisioning network routes to optimize transmission characteristics. For example, techniques are known that determine the shortest distance between nodes, the fewest number of links to be traversed between nodes, and the minimum cost route (where a weighted value or "cost" is assigned to each network link). However, these techniques do not work well when the number of possible routes becomes large, or special conditions exist that are not characterized by a weight or cost. The number of routes may be large due to the network type, e.g., a mesh network in which nodes may be linked to multiple other nodes, or due to the type of data traffic for which routes are being provisioned, e.g., broadcast traffic where routes must be provisioned from a source node to each of multiple drop nodes. Further, in the case of broadcast data, a secondary (i.e., backup) source node is often used, and routes must be provisioned from the secondary source node to each drop node, preferably using diverse routing (i.e., routes that differ from the routes used from the primary source node).

One approach to achieve diverse routing in a mesh network has been to divide the mesh network into plural ring networks. In a ring network, each node is linked to just two other nodes, so traffic received on one link is always sent out on the other link, and vice versa. Diverse routing is achieved within each ring by routing the unidirectional traffic in opposite directions along the ring. However, this approach is not optimal for a mesh network, because some of the nodes might get the same traffic flow more than once, and therefore some of the links may be overutilized.

SUMMARY OF THE INVENTION

According to a one aspect of the present invention, a method to provision routes in a network having a plurality of nodes includes receiving a designation of a primary source node, determining possible destination nodes from the designated source node and outputting information indicating the possible destination nodes. The method further includes receiving a designation of a destination node from among the possible destination nodes and updating information regarding optical characteristics based on a route from the source node to the designated destination node, and outputting information related to the updated optical characteristics According to another aspect of the present invention, a method to provision routes in a network having a plurality of nodes includes receiving a designation of a source node, determining possible destination nodes from the designated source node, and outputting information indicating the possible destination nodes. The method also includes receiving a designation of a destination node from among the possible destination nodes, determining possible routes from the source node to the designated destination node, and outputting information indicating the possible routes. Further, the method includes updating information regarding optical characteristics for each possible route from the source node to the designated destination node, outputting information related to the optical characteristics, and receiving a designation of a route from among the possible routes to the destination node.

According to a further aspect of the present invention, an apparatus to provision routes in a network is provided that includes a memory to store information regarding a plurality of network nodes and links connecting network nodes, a display to display information regarding the plurality of network nodes and the links connecting the network nodes, and a user interface to input user designations. The apparatus also includes a processor to control the apparatus to (i) receive a designation from the user interface indicating a source node, (ii) determine possible destination nodes from the designated source node, (iii) display information regarding the possible destination nodes, (iv) receive a designation from the user interface indicating a destination node selected from among the possible destination nodes, (v) update information regarding optical characteristics based on the designated destination node and the stored information regarding links between network nodes, and (vi) display information related to the updated optical characteristics.

According to yet another aspect of the present invention, a computer program embodied in a computer-readable storage medium is provided. The computer program includes program code to control an apparatus to receive a designation indicating a source node among a plurality of network nodes, determine possible destination nodes from the designated source node, and display information regarding the possible destination nodes. The program code further controls the apparatus to receive a designation indicating a destination node selected from among the possible destination nodes, update information regarding optical characteristics based on the designated destination node and stored information regarding links between network nodes, and display information related to the updated optical characteristics.

According to still another aspect of the present invention, a method to provision routes in a network having a plurality of nodes includes designating a primary source node, designating a destination node in a display of possible destination nodes from the designated primary source node, and designating a node as a regeneration node, based on displayed information concerning optical characteristics updated based on the designated destination node.

These and other aspects of the present invention will be described in further detail below, with reference to the accompanying drawings.

DETAILED DESCRIPTION

An example embodiment of a process to provision network routes for dual-source unidirectional broadcast data will be explained with respect to FIGS. 1 to 3. This example embodiment can be applied, for example, to a video broadcast. In a video broadcast, the video signal originates at a particular node, which will be referred to herein as the primary source node. The video signal must be routed to every drop node in the network, i.e., every node where the video signal will be used. Further, to minimize outages in the event of a problem with the primary source node, a backup source for the video signal may be used, which will be referred to herein as the secondary source node. Those skilled in the art will appreciate from the following description that the present invention is not necessarily limited to video data, dual-source data, or broadcast data.

Figure 1:
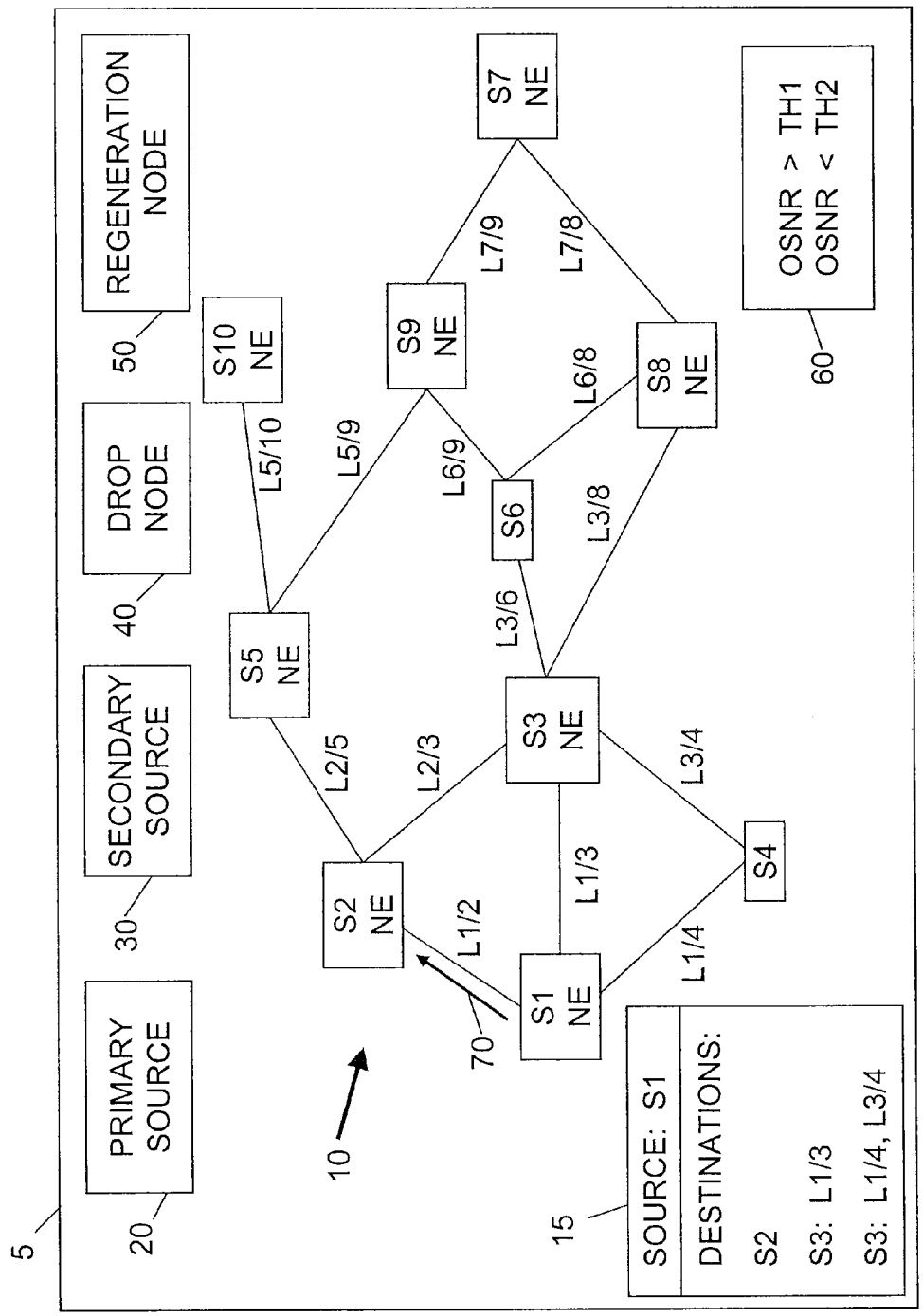
FIG. 1 illustrates a display of a network having a plurality of nodes, to which an example embodiment of the present invention may be applied.

FIG. 1 illustrates a display 5 showing a network 10 having multiple nodes, numbered S1 to S10. Display 5 also includes a drop-down menu 15, soft buttons 20, 30, 40, and 50 for respectively designating a node as a primary source, a secondary source, a drop node, and a regeneration node (i.e., a node where the data signal is regenerated), and a display area 60 for displaying information related to optical characteristics.

Some of the nodes in network 10 include network equipment that can serve as a drop node, i.e., a node where the data can be used. On the other hand, some of the nodes are so-called "glass" nodes. Glass nodes do not contain network equipment that allow the node to serve as a drop node. For example, a glass node may merely include a signal repeater, a patch panel, or some other interface connecting two different transmission links or different types of transmission links. In FIG. 1, nodes S1-S3, S5, and S7-S10 are nodes having network equipment, as indicated by the label "NE" at those nodes, and nodes S4 and S6 are glass nodes. Further, node S10 is referred to as a spur node, because it is connected to only one other node.

As shown in FIG. 1, there are links interconnecting various nodes. In the example embodiment these links are optical fiber links, but the links are not limited to optical fibers. The links are designated using the numbers of the nodes they connect. For example, the link between node S1 and node S2 is designated L1/2, and the link between node S3 and node S4 is designated L3/4.

Data is routed from the primary source node to one or more drop nodes. In this example embodiment, node S1 will be designated as the primary source node. Since this example embodiment illustrates provisioning network routes for broadcast data, all other nodes having network equipment will be drop nodes in this example. So, in this example embodiment, a route will be provisioned from node S1 to each other node having network equipment, namely, nodes S2, S3, S5, and S7-S10.

A user can designate a primary source node using a user interface such as a mouse. In this example embodiment, display 5 includes "soft" option buttons 20 for designating a primary source node and 30 for designating a secondary source node. The user can select button 20 with the mouse, and then move the cursor over node S1 and click on it to designate node S1 as the primary source node. Preferably, node S1 will be highlighted or colored on display 5.

Routes are provisioned in increments of a "hop," where a hop is a route between two nodes having network equipment that does not pass through another node having network equipment (but it may pass through a glass node). Each hop routes the data signal from a source node to a destination node. (While there is only one primary source node, i.e., the original source of the data signal, many network nodes function as a "source" node for a particular hop.) Thus, a destination node, as used herein, refers to another node having network equipment that can be reached from the currently designated source node in one hop. Put another way, a destination node is a node having network equipment that is linked to a particular source node either directly or via one or more glass nodes. A destination node can be a drop node, where the data signal is used, or simply a pass-through node that passes the data signal on to other nodes. Whether the destination node is a drop node or a pass-through node, in either case it can serve as a source node for the next signal hop. Also, a destination node can be a regeneration node, where the data signal is regenerated so it can be transmitted to subsequent nodes with adequate properties (e.g., sufficient strength, signal-to-noise ratio, etc.). Note that these functions are not mutually exclusive. A given destination node might function as a drop node, a regeneration node, and a source node for another hop. Since this example embodiment relates to broadcast data, each destination node is also a drop node.

Referring to FIG. 1, after node S1 is designated as the primary source node, the possible destination nodes are S2 and S3. S4 is not considered a possible destination node, because it is a glass node having no network equipment. However, there are two routes to node S3 from node S1: via link L1/3 and via the pair of links L1/4 and L3/4. Information is displayed on display 5 to indicate the possible destination nodes. In this example embodiment, the information is displayed in the form of a drop-down menu 15. Menu 15 includes a listing of all possible destination nodes for the currently designated source node, but excludes glass nodes. Where there is more than one route from the source node to a given possible destination node, menu 15 includes multiple entries for the given possible destination node, with each entry including a designation of one of the possible routes. As shown in FIG. 1, therefore, drop-down menu 15 includes entries for S2, S3-L1/3, and S3-L1/4, L3/4.

Alternatively, the information indicating possible destination nodes could be output by highlighting nodes and links on display 5. For example, possible destination nodes and the routes to them from the source node could be highlighted in color, and multiple colors could be used if there is more than one route to a possible destination node.

In the example embodiment, a user can designate a node as a destination node by clicking on one of the entries listed in menu 15. After a destination node is designated, the user can designate the node as a drop node by clicking on soft button 40. Also, when a destination node is designated, optical characteristics for the route are updated based on stored information regarding the network links. In the example embodiment, the optical characteristics are updated based on the optical signal-to-noise ratio (OSNR). In particular, since the properties of the signal are known at the source node and the properties of the link or links in the route are known, the OSNR at the designated destination node, after traversing the route, can be calculated. Alternatively, other characteristics such as polarization mode dispersion, chromatic dispersion, attenuation, or a combination of plural characteristics can be updated. Further, an updated value for the characteristic can be output as a raw value, or the updated value can be compared to one or more thresholds and the result of the comparison or comparisons can be output.

In this example embodiment, an updated OSNR is compared to two thresholds and the results are output by displaying the comparison results in area 60 of display 5. First, the OSNR is compared to a threshold that indicates whether the data signal will have acceptable properties (e.g., a sufficiently high OSNR) if the signal is routed to the designated destination node using the designated route. If the OSNR value is below the threshold, then the user should either (i) designate an upstream node as a regeneration node, in order to regenerate the signal with sufficient strength that it can be satisfactorily routed along the designated route to the designated destination node, or (ii) if an alternative route is available to the destination node, designate the alternative route and view the results of the updated optical characteristics.

Next, the OSNR is compared to a second threshold that indicates whether the data signal will have an acceptable value if it is transmitted from the designated destination node to a further node. If the OSNR is below the threshold value, than the user should either (i) designate the designated destination node as a regeneration node, or (ii) if an alternative route is available to the designated destination node, designate the alternative route and view the results of the updated optical characteristics. FIG. 1 illustrates how the result of the comparison of the OSNR to the two threshold values may be displayed.

Thus, the user uses the updated optical characteristics to determine whether (i) the designated destination node should be designated as a regeneration node, (ii) an upstream node should be designated as a regeneration node, or (iii) an alternative route (if one exists) should be designated to reach the destination node. By updating the optical characteristics based on a designated destination node, the user can interactively provision routes while taking into consideration factors beyond those conventionally used by automatic routing algorithms (shortest distance, minimum cost, fewest links, etc.). For example, the user can select alternative routes where multiple routes are available, in an effort to minimize the required number of regeneration nodes. Further, if the user has a choice among alternative routes to a possible destination, the user can take other factors into account when interactively selecting a route. For example, the user can consider whether a route involving a particular node or link should be avoided based on factors such as, for example, office power, current network element utilization, current span utilization, tariffs and other factors relating to geographical boundaries, poor fiber installations, high outage areas, and potential "danger zones" where outages may occur due to weather or other factors.

Referring again to FIG. 1, a user can designate node S2 from among the possible destination nodes from source node S1. Since each node is to be a drop node in this example relating to a broadcast, the user designates node S2 as a drop node. Also, since there is only one route from S1 to S2, the user observes the updated optical characteristics information in area 60 and makes any necessary designation of a node as a regeneration node. Also, an indicator such as solid arrow 70 may be displayed, to indicate data flow from S1 to S2.

Since node S2 is now selected, node S2 becomes the current source node for determining the next hop. Possible destination nodes from node S2 are displayed in menu 15. Those possible destination nodes will be nodes S5 and S3. The user can designate node S5 as the destination node, designate the node as a drop node, and make any necessary designation of a regeneration node based on the updated optical characteristics. Each time the optical characteristics are updated, any previously designated regeneration nodes are taken into account.

Next, the displayed possible destination nodes from node S5 will be nodes S10 and S9. The user can designate node S10 as the destination node, designate node S10 as a drop node, and review the updated optical characteristics information to make any necessary designation of a regeneration node. Since node S10 is a spur node, there are no further possible destination nodes from node S10. Therefore, menu 15 will contain no entries, and the optical characteristics information with respect to the second threshold will indicate N/A.

The user can now go back to a previous node, e.g., node S5, and click on that node again to designate it as the current source node. In this example embodiment, nodes that are already designated as drop nodes (i.e., a route to the node has already been provisioned), will be excluded from the list of possible destination nodes. Therefore, menu 15 will only include node S9 as a possible destination node. The user can continue the process of selecting source nodes, selecting a possible destination node from those available from source node, designating nodes as drop nodes, and designating nodes as regeneration nodes based on the updated optical characteristics, until routes have been provisioned to all the intended drop nodes (in this case, all the nodes having network equipment).

In many cases, it is desirable to have a secondary source in case a problem develops with a primary source of data transmission. Accordingly, the user can select soft button 30 and then designate a node as a secondary source, such as node S2. The user can then provision routes to each drop node from secondary source node S2 in a manner like that described above for the primary source node.

With respect to the secondary source node, there are two conventions adhered to in this example embodiment. First, any nodes designated as regeneration nodes while provisioning routes from the primary source node are taken into consideration when updating the optical characteristics of a route.

Second, in order to achieve diverse routing, data from the secondary source node S2, which traverses a link used by data from the primary source node S1, must traverse the link in the opposite direction. Put another away, only one type of network traffic (Primary, from the primary source node, or Secondary, from the secondary source node) may flow in a specific direction on a given link. For example, referring to FIG. 1, node S1 is a possible destination from node S2, because the data from node S2 can travel to node S1 on link L1/2 in the opposite direction from data traveling on that same link from node S1 to node S2. Also, node S3 is a possible destination node from node S2, because link L2/3 was not used in provisioning routes from primary node S1. However, node S5 is not a destination node from node S2. Data from node S2 cannot use link L2/5 because it would be traveling in the same direction as data routed from primary source node S1. Further, there is no alternative route that does not pass through another node containing network equipment. It is noted that in some cases a route cannot be provisioned to certain nodes from the designated secondary source node. For example, there is only one link to a spur node such as node S110.

Figure 2:
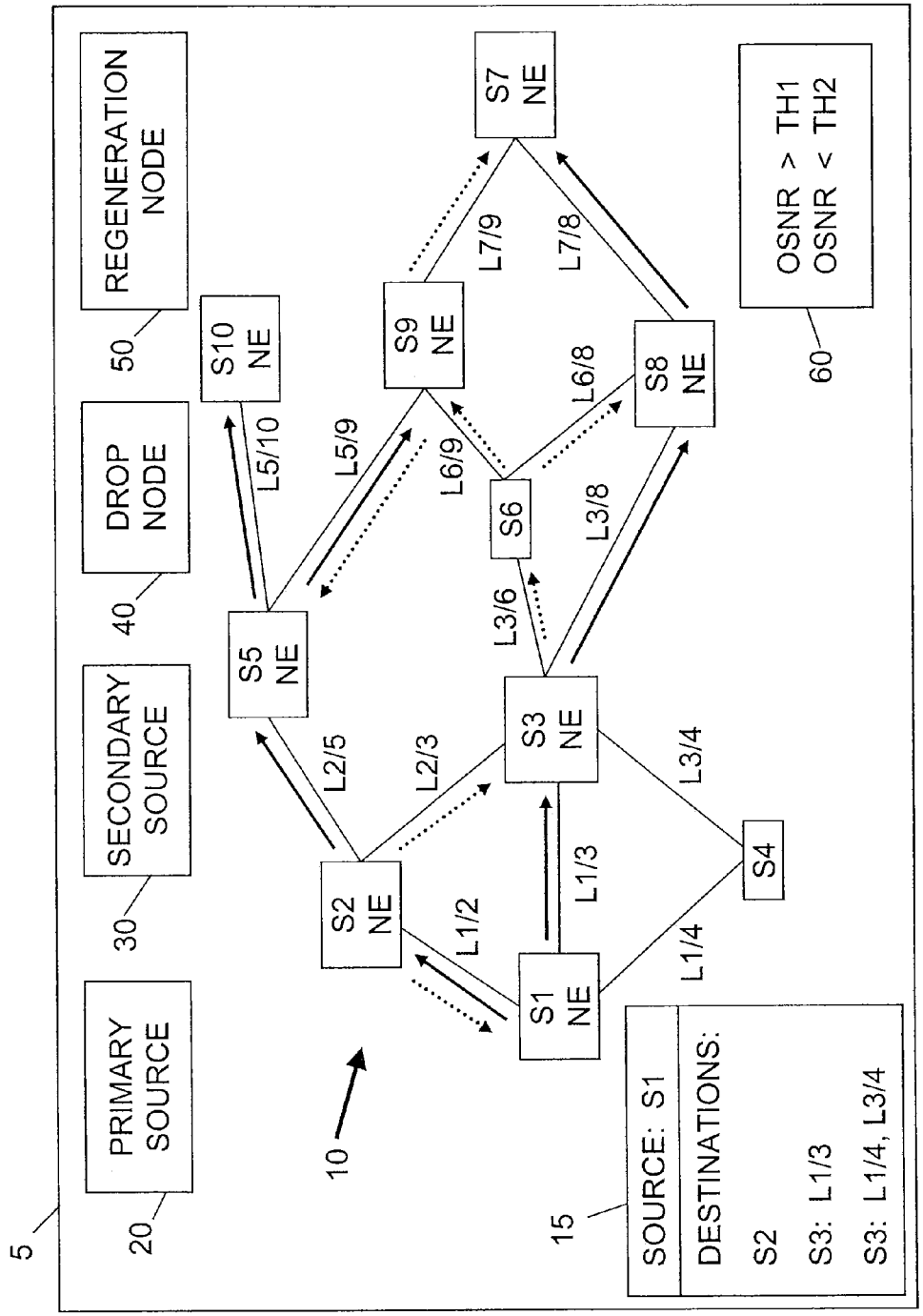
FIG. 2 illustrates a display of a network having a plurality of routes designated for a primary source node and a secondary source node.

FIG. 2 illustrates network 10 with routes from the primary and secondary source nodes indicated. Dotted arrows are used to designate routes from the secondary source node S2.

Information regarding the identification of each node and link in the network, optical properties of the links, the routes provisioned between nodes, the type of node (e.g., source, drop, regeneration, spur, or a combination), and the like can be stored in a memory. This information can be used to generate a report, which can be formatted appropriately and output to a display or printer for review by a user or for hardcopy archiving. In addition, the information can be used to generate a bill of materials, i.e., equipment necessary to implement the network, and/or a cost for the network. Further, the stored information can be compared to other configurations of routes and regeneration nodes, to determine which configuration is less expensive.

In the example embodiment described above, each designated destination node was in turn used as the source node to determine the next hop, until no further possible destination nodes existed, and then a previous node was returned to in order to provision routes along other paths. Alternatively, routes may first be provisioned for all possible destination nodes from a given source node, before designating a destination node as a new source node. In other words, a "breadth-first" rather than a "depth-first" approach may be used.

Figure 3:
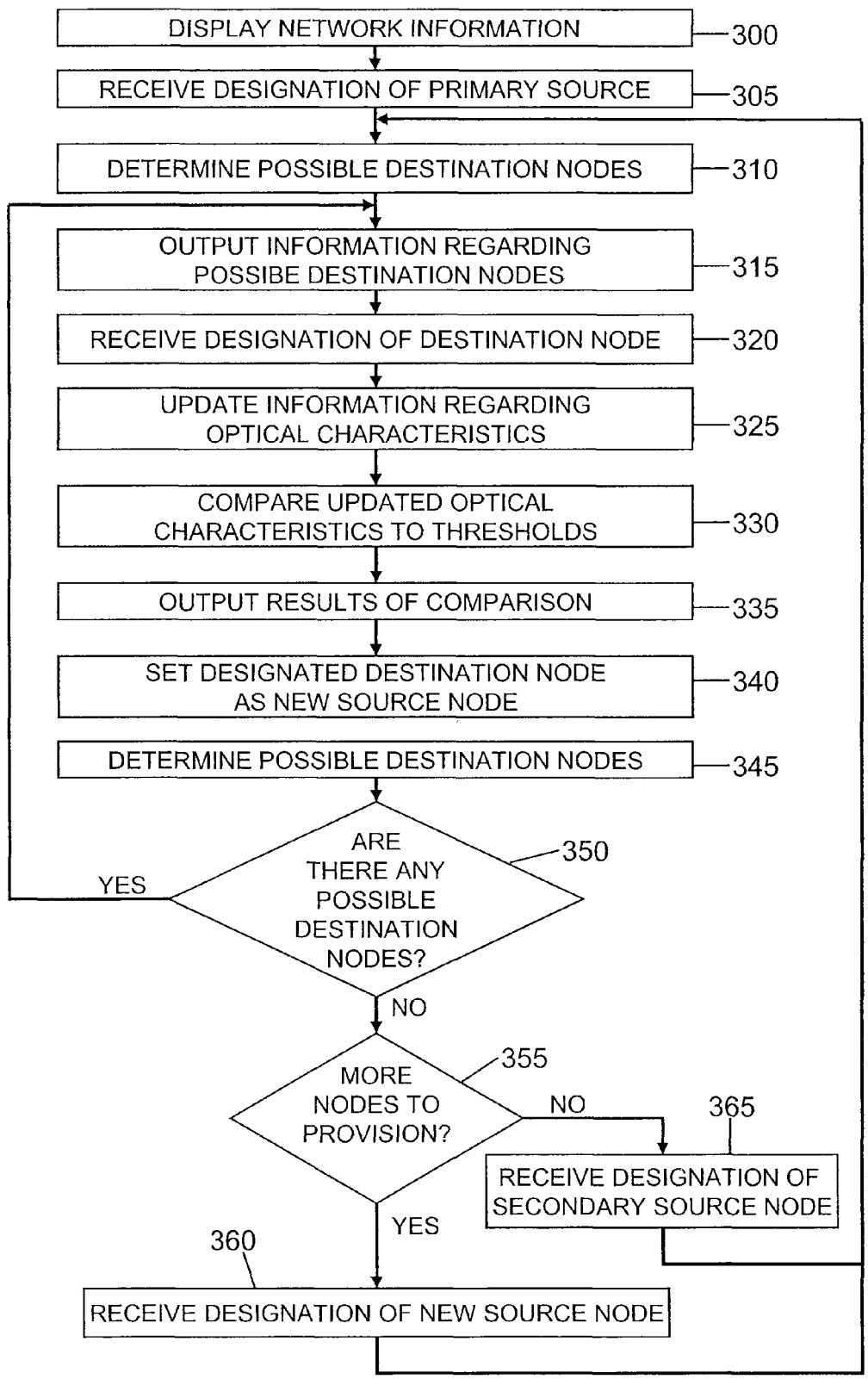
FIG. 3 illustrates an example embodiment of a process to provision routes in a network according to the present invention.

FIG. 3 illustrates a process according to an example embodiment of the present invention. In block 300, information regarding a network, such as that shown in FIG. 1, is displayed. In block 305, a designation of a primary source node is received. For example, this designation may be received from a user interface.

Next, in block 310, possible destination nodes are determined from the designated source node, and information indicating the possible destination nodes is output in block 315. For example, the information may be output as a drop-down menu like menu 15 shown in FIG. 1. Then, in block 320, a designation of a destination node is received. If more than one route is possible to the designated destination node, then the designation includes a designation of a particular route. (If there is only one route, that route is implicitly included in the designation of the destination node.)

In block 325, information regarding optical characteristics is updated based on the designated destination node and the route to that node, as well as stored optical characteristics of the nodes and links, and any designated regeneration nodes. The updated optical characteristics are compared to two thresholds in block 330, and information related to the updated optical characteristics—in this example, the result of the comparison—is output in block 335. The information can be output by displaying it at a predetermined area of a display, for example. By reviewing the information output in block 335, a user can determine whether to designate a node as a regeneration node. The user can also designate appropriate nodes as drop nodes. Accordingly, a designation of a node as a drop node and/or a regeneration node may be received.

In block 340, the designated destination node is set as a new source node, and in block 345 the possible destination nodes are determined for the new designated source node. In block 350, a decision is made as to whether there are any possible destination nodes for the new source node. If so, then the process returns to block 315 to output information indicating the possible destination nodes. If it is decided in block 350 that there are no possible destination nodes for the current source node, then a decision is made in block 355 as to whether there are any remaining nodes for which a route has not been provisioned (i.e., nodes that have not been designated as drop nodes, in this broadcast example). If there are remaining nodes that need routes provisioned, then a designation of a new source node is received in block 360 and flow returns to block 310. If not, than a designation of a secondary source node is designated in block 365 and flow returns to block 310. Processing is the same for the secondary source node, except that block 310 takes into account routes provisioned for the primary source node when determining possible destination nodes, so that data from the secondary source node cannot traverse the same link in the same direction, and block 325 takes into account nodes already designated as regeneration nodes when updating optical characteristics.

Figure 4:
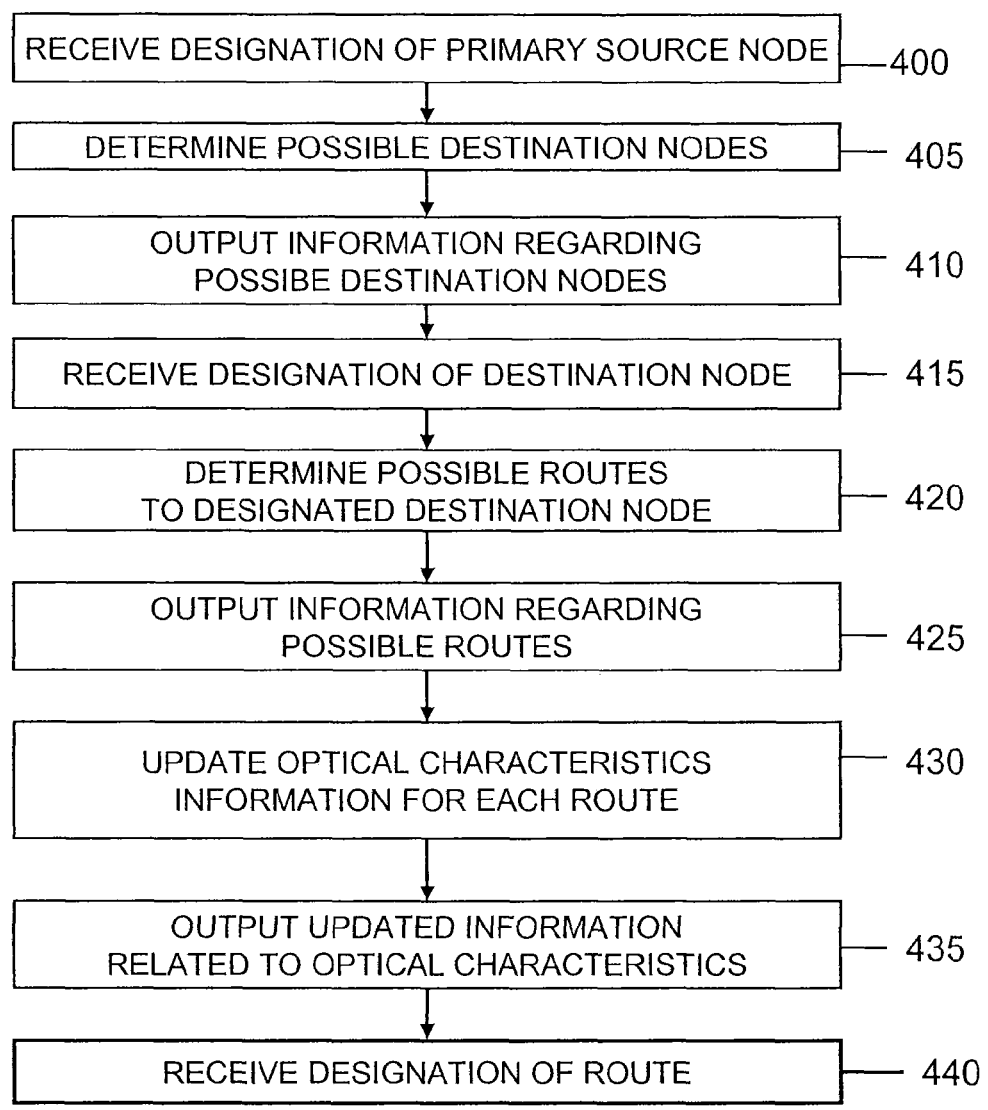
FIG. 4 illustrates another embodiment of a process to provision routes in a network according to the present invention.

FIG. 4 illustrates an alternative example embodiment of the present invention. As described above with respect to the example embodiment in FIG. 1, information indicating possible destination nodes is output in the form of a menu listing possible destination nodes. If there are multiple routes possible to a given possible destination, there are multiple entries for the given possible destination, each one including an indication of one of the possible routes. Hence, a possible destination and a particular route to that destination are selected together. Alternatively, the destination can be selected first, and then a route to the destination selected separately.

As shown in FIG. 4, a designation of a primary source node is received in block 400. Then, possible destination nodes are determined in block 405, and information indicating the possible destination nodes is output in block 410. In this example embodiment, the output information is indicated by highlighting possible destination nodes on display 5, although a list of the destination nodes (without an indication of specific routes) could also be used. In block 415, a designation is received of a designated destination node. In this example embodiment, the designation may come from a user interface where a user uses a mouse to click on a highlighted possible destination node on display 5. Then, in block 420, possible routes to the designated destination node are determined, and in block 425 information is output to indicate the possible routes. In this example embodiment, the information is highlighting of the possible routes on display 5, although it could also be a list of routes. In block 430, optical characteristics are updated for each possible route to the designated destination node, and in block 435 information is output relating to the updated optical characteristics. For example, the information can be displayed adjacent to each respective possible route, or in table form with a display entry corresponding to each possible route. Alternatively, the possible route having the best value for the optical characteristics could be highlighted or displayed in a different color.

A user can determine which possible route to the designated destination is preferred, based on the information related to the updated optical characteristics, and in block 340 a designation of a route from among the possible routes is received. The designation may be from a user interface when a user uses a mouse to click on one of the highlighted possible routes. The information regarding the updated optical characteristics can then be displayed in area 60, and processing can proceed as in block 340 of FIG. 3, with further processing similar to that of FIG. 3.

In the example embodiment of FIG. 4, the updated optical characteristics are determined for each possible route, and information related to the updated characteristics is displayed prior to selection of a particular possible route. Alternatively, information regarding the possible routes can be output, and then after a designation of a particular route is received, the optical characteristics can be updated for the designated route and information regarding the updated optical characteristics can be output.

Figure 5:
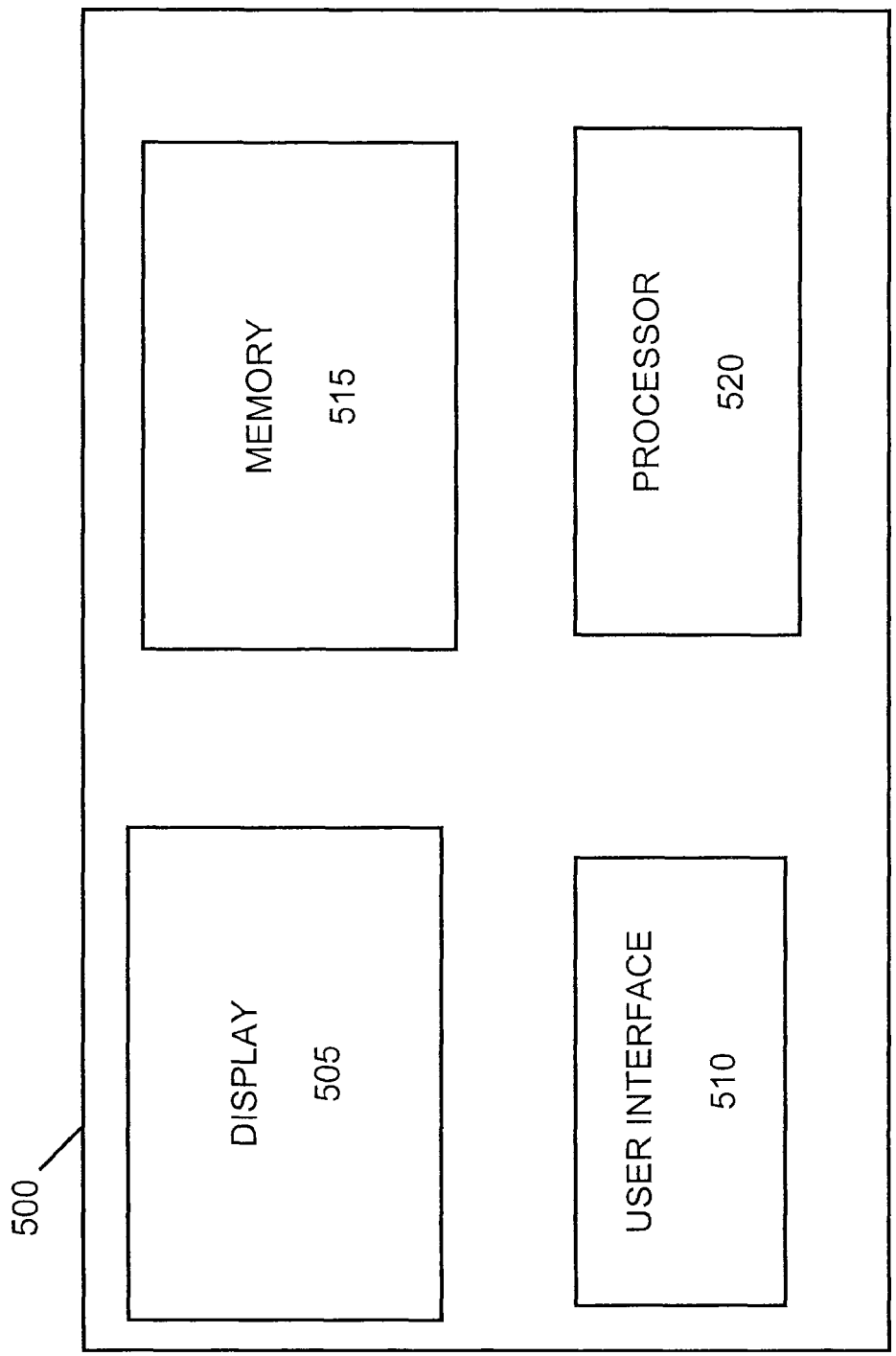
FIG. 5 illustrates an example embodiment of an apparatus to provision routes in a network according to the present invention.

FIG. 5 illustrates an example embodiment of an apparatus to provision network routes according to the present invention. As shown in FIG. 5, an apparatus 500 includes a display 505 and a user interface 510, such as a mouse. Apparatus 500 also includes a memory 515 to store information regarding network nodes, links, and routes. While memory 515 is illustrated as a single memory, those skilled in the art will appreciate that it may include multiple memory devices, which may be of different types, and may provide memory for storing control programs and working memory used during information processing and/or display.

FIG. 5 further includes a processor 520 to control the apparatus. In this example embodiment, processor 520 executes program code stored in memory 515, which causes the apparatus to perform a process as described with respect to FIGS. 1 to 3. The program code may, for example, be stored in a read-only section of memory 515, be stored on a removable computer-readable medium and transferred to apparatus 500, or be downloaded to apparatus via a communication link, e.g., via the internet. Also, those skilled in the art that rather than a processor or computer executing program code, apparatus 500 could be controlled by an equivalent hardware circuit providing the same functions.

Figure 6:
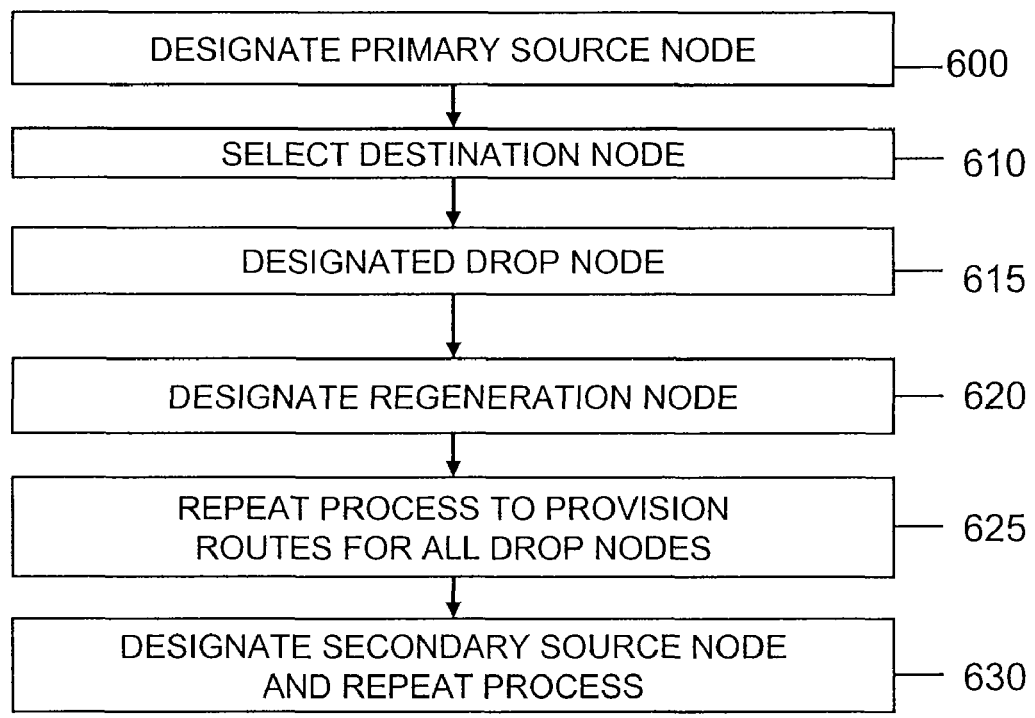
FIG. 6 illustrates an example embodiment of a process followed by a user to provision routes in a network according to the present invention.

FIG. 6 illustrates an example embodiment of a process followed by a user to provision network routes, according to the present invention. In block 600, a user designates a primary source node. The designation may be made, for example, by clicking on a symbol representing a node in a display of a network. In block 610, the user designates a destination node in a display of possible destination nodes from the designated source node. In this example embodiment, the designation is made by selecting an entry from a drop-down menu. If there is more than one possible route to a given possible destination node, than the entries in the drop-down menu will include both the possible destination node and an indication of a particular route. Alternatively, the designation could be made by clicking on nodes and/or links in a display of the network.

In block 615, the user designates the designated destination node as a drop node, if the signal is to be dropped at that node.

In block 620, the user designates a node as a regeneration node, based on displayed information relating to updated optical characteristics based on the designated destination node. In this embodiment, the displayed information indicates the result of a comparison of the updated optical characteristics to two thresholds. By reviewing the displayed information, the user can determine whether (i) the data signal needs to be regenerated upstream in order to reach the designated destination node using the designated route, and (ii) whether the data signal needs to be regenerated at the designated destination node before being sent on to another node.

In block 625, the process is repeated until routes have been provisioned for all drop nodes. Then, in block 630, a secondary source node is designated and the process is repeated.

The above-described example embodiments have been explained with respect to a mesh network. Those skilled in the art will recognized that the present invention is not limited to a mesh network, but may also be applied to a network of interconnected rings, other networks having nodes with multiple degrees of connectivity, and other networks where there may be multiple possible routes between a source node and a destination node. Further, while the above-embodiments have been discussed in the context of routing broadcast traffic, and in particular in the context of dual source routing of broadcast data, those skilled in the art will appreciate that the present invention is not limited to broadcast data. Also, while example embodiments have been described where all possible destination nodes are determined from a designated source node, one skilled in the art will appreciate that not all possible destination nodes need to be determined. For example, restrictions can be imposed that limit the possible destination nodes. For example, a user could set a limit of two links, so that the possible destination nodes only include nodes that can be reached via two or fewer links.

Other variations and embodiments are also possible. Accordingly the scope of the invention is not intended to be limited to the specific examples and embodiments presented above, but rather should be determined by reference to the claims appended hereto.

We claim:

1. A procedure to provision routes in a network having a plurality of nodes, comprising:
   (a) receiving a designation of a primary source node;
   (b) determining possible destination nodes from the designated source node and outputting information indicating the possible destination nodes, wherein the possible destination nodes are nodes within a single hop of the primary source node;
   (c) receiving a designation of a destination node from among the possible destination nodes; and
   (d) updating information regarding optical characteristics based on a route from the source node to the designated destination node;
   (e) comparing the updated optical characteristics to
      (i) a first threshold value related to signal transmission from the primary source node to the designated destination node, and
      (ii) a second threshold value related to signal transmission beyond the designated destination node; and
   (f) outputting information related to the updated optical characteristics.

2. A procedure according to claim 1, wherein when at least two possible destination nodes are determined in (b), the procedure further comprises:
   repeating (c) through (f) until all possible destination nodes for the designated source node have been designated.

3. A procedure according to claim 1, further comprising:
   repeating (b) through (f) using the designated destination node as a source node.

4. A procedure according to claim 1, wherein, when more than one route exists from the designated source node to a given possible destination node, the output information indicating the possible destination nodes includes information indicating each possible route to the given possible destination node.

5. A procedure according to claim 4, wherein receiving a designation of a destination node comprises receiving a designation of a possible destination node and a particular route to the designated destination node, and the updating comprises updating information regarding optical characteristics based on the particular route to the designated destination node.

6. A procedure according to claim 1, wherein the updating comprises updating information regarding at least one of optical signal-to-noise ratio, polarization mode, chromatic dispersion, and attenuation.

7. A procedure according to claim 6, further comprising:
(g) displaying a result of the comparison between the updated optical characteristics and the first threshold value; and
(h) displaying a result of the comparison between the updated optical characteristics and the second threshold value.

8. A procedure according to claim 7, further comprising:
receiving a designation of a node as at least one of a drop node and a regeneration node.

9. A procedure according to claim 8, further comprising:
generating a report including, for each node in the network, the type of node and the routes used to the node.

10. A procedure according to claim 8, further comprising:
generating information regarding at least one of (i) the cost to implement a network using the designated routes and (ii) a bill of materials needed to implement a network using the designated routes.

11. A procedure according to claim 1, further comprising:
receiving a designation of a secondary source node, wherein the secondary source node is different from the primary source node; and
repeating (b) through (f) based on the secondary source node.

12. A procedure according to claim 11, wherein, when determining possible destination nodes, data from the secondary source node is prohibited from traversing a link in the same direction as data from the primary source node but is permitted to traverse the link in a direction opposite to data from the primary source node.

13. A procedure according to claim 11, wherein the updating of optical characteristics while provisioning routes for the secondary source node takes into consideration nodes that have been designated as regeneration nodes while provisioning routes for the primary source node.

14. A procedure to provision routes in a network having a plurality of nodes, comprising:
receiving a designation of a source node;
determining possible destination nodes from the designated source node and outputting information indicating the possible destination nodes, wherein the possible destination nodes are nodes within a single hop of the primary source node;
receiving a designation of a destination node from among the possible destination nodes;
determining possible routes from the source node to the designated destination node and outputting information indicating the possible routes;
updating information regarding optical characteristics for each possible route from the source node to the designated destination node and outputting information related to the optical characteristics;
comparing the updated optical characteristics to a first threshold value related to signal transmission from the primary source node to the designated destination node;
comparing the updated optical characteristics to a second threshold value related to signal transmission beyond the designated destination node; and
receiving a designation of a route from among the possible routes to the destination node.

15. An apparatus to provision routes in a network, comprising:
a memory to store information regarding a plurality of network nodes and links connecting network nodes;
a display to display information regarding the plurality of network nodes and the links connecting the network nodes;
a user interface to input user designations; and
a processor to control the apparatus to (i) receive a designation from the user interface indicating a source node, (ii) determine possible destination nodes from the designated source node, wherein the possible destination nodes are nodes within a single hop of the primary source node, (iii) display information regarding the possible destination nodes, (iv) receive a designation from the user interface indicating a destination node selected from among the possible destination nodes, (v) update information regarding optical characteristics based on the designated destination node and the stored information regarding links between network nodes, (vi) compare the updated optical characteristics to a first threshold value related to signal transmission from the primary source node to the designated destination node, (vii) compare the updated optical characteristics to a second threshold value related to signal transmission beyond the designated destination node, and (viii) display information related to the updated optical characteristics.

16. An apparatus according to claim 15, wherein the processor controls the display to display symbols representing each network node, each link connecting network nodes, and a designated route between a source node and a destination node.

17. An apparatus according to claim 15, wherein the processor displays information regarding possible destination nodes by displaying a drop-down menu listing possible destination nodes for the designated source node.

18. An apparatus according to claim 17, wherein, when there are multiple possible routes from a source node to a given possible destination node, the given possible destination node is listed multiple times in the drop-down menu, with each listing including an indication of one of the possible routes.

19. An apparatus according to claim 18, wherein the processor receives a designation of a possible destination node and a possible route and updates the information regarding optical characteristics based on the designated destination node and the designated route.

20. An apparatus according to claim 15, wherein the processor displays a result of the comparison between the updated optical characteristics and the first threshold value, and a result of the comparison between the updated optical characteristics and the second threshold value.

21. A computer program embodied in a non-transitory computer-readable storage medium, the program comprising code to control an apparatus to:
receive a designation indicating a source node among a plurality of network nodes;
determine possible destination nodes from the designated source node, wherein the possible destination nodes are nodes within a single hop of the primary source node;
display information regarding the possible destination nodes;
receive a designation indicating a destination node selected from among the possible destination nodes;

update information regarding optical characteristics based on the designated destination node and stored information regarding links between network nodes;

compare the updated optical characteristics to a first threshold value related to signal transmission from the primary source node to the designated destination node;

compare the updated optical characteristics to a second threshold value related to signal transmission beyond the designated destination node; and display information related to the updated optical characteristics.

22. A procedure to provision routes in a network having a plurality of nodes, comprising:

selecting a primary source node in a display of plural nodes, using a user interface;

selecting a destination node in a display of possible destination nodes from the designated primary source node, using the user interface, wherein the possible destination nodes are nodes within a single hop of the primary source node; and selecting a node as a regeneration node, using the user interface, based on
 (i) displayed information concerning optical characteristics updated based on the designated destination node,
 (ii) displayed information concerning a comparison between the optical characteristics and a first threshold value related to signal transmission from the primary source node to the designated destination node and,
 (iii) displayed information concerning a comparison between the optical characteristics and a second threshold value related to signal transmission beyond the designated destination node.

23. A procedure according to claim 22, wherein designating a primary source node comprises selecting a symbol corresponding to a node on a display, and designating a destination node comprises selecting a possible destination node from a displayed drop-down menu listing the possible destination nodes.

24. A procedure according to claim 23, wherein, when there is more than one possible route from the primary source node to a given possible destination node, designating a destination node comprises designating the given possible destination node and a particular route to the given possible destination node from the drop-down menu.

25. A procedure according to claim 22, further comprising:

designating a secondary source node;

designating a possible destination node from a display of possible destination nodes from the secondary source node; and designating a node as a regeneration node, based on displayed information concerning optical characteristics updated based on the designated destination node.

26. A procedure to provision routes in a network having a plurality of nodes, comprising:

receiving a designation of a primary source node;

determining possible destination nodes from the designated source node and outputting information indicating the possible destination nodes, wherein the possible destination nodes are nodes within a single hop of the primary source node;

receiving a designation of a destination node from among the possible destination nodes; and updating information regarding optical characteristics based on a route from the source node to the designated destination node;

outputting information related to the updated optical characteristics;

receiving a designation of a secondary source node, wherein the secondary source node is different from the primary source node; and determining possible destination nodes from the secondary source node, wherein, when determining possible destination nodes, data from the secondary source node is prohibited from traversing a link in the same direction as data from the primary source node but is permitted to traverse the link in a direction opposite to data from the primary source node.

* * * * *